Feb. 21, 1967 A. F. SCHMECKENBECHER 3,305,327

ELECTROLESS PLATING OF MAGNETIC MATERIAL AND MAGNETIC MEMORY ELEMENT

Original Filed Dec. 28, 1961 2 Sheets-Sheet 1

INVENTOR
ARNOLD F. SCHMECKENBECHER

BY John W Armbruster
ATTORNEY

United States Patent Office
3,305,327
Patented Feb. 21, 1967

3,305,327

ELECTROLESS PLATING OF MAGNETIC MATERIAL AND MAGNETIC MEMORY ELEMENT

Arnold F. Schmeckenbecher, Poughkeepsie, N.Y., assignor to International Business Machines Corporation, Armonk, N.Y., a corporation of New York Continuation of application Ser. No. 162,897, Dec. 28, 1961. This application Jan. 26, 1965, Ser. No. 428,162
7 Claims. (Cl. 29—195)

This application is a continuation of the application Serial No. 162,897, filed on December 28, 1961, now abandoned.

This invention relates to electroless chemical deposition of magnetic material on nonmetallic substances and more particularly to the deposition of nickel iron alloys on glass, ceramic or plastic substrates.

An object of the invention is the provision of chemical materials and processes whereby useful ferromagnetic materials may be rapidly deposited directly upon nonmetallic and nonconductive materials without the need for preliminary sensitizing, electroplating or vacuum deposition of other undercoatings.

Another object of the invention is the provision of electroless chemical deposition processes for establishing adherent ferromagnetic thin films upon substrates without the need for preliminary treatment with stannous and palladous sensitizing or separate chelating treatments as required in the prior art.

Another object of the invention is the provision of electroless magnetic film deposition processes for establishing oriented magnetic films as adherent undercoatings which are comparatively rich in percentage of iron and deposited quickly and directly at room temperature.

Another object of the invention is the provision of improved alkaline nickel iron chemical deposit baths into which chelating agents are added and also agents to induce controlled decomposition.

Another object of the invention is the provision of better electroless chemical compositions and methods of utilizing sodium hypophosphite as a reducing agent in a nickel iron bath wherein the iron is proportioned therewith and with palladium chloride, hydrochloric acid and an alkalizer so as to result in an iron rich deposit which is exceptionally low in the percentage of phosphorous found in the resulting thin magnetic film.

Another object of the invention is the provision of an electroless chemical deposition method for producing an oriented anisotropic thin magnetic film by the combined effect of a magnetic field present during the submersion of a nonmetallic substrate in a ferromagnetic solution including a chelating agent. In the case of depositing magnetic material on a cylindrical glass rod, a wire is present running through the center of the rod and carries current to create a magnetic field serving to orient chemical deposition of the magnetic alloy on the cylindrical surface of the glass. As an undercoat, the thickness is limited to about 500 A.

Another object of the invention is the provision of electroless magnetic materials and processes effective for economical deposition of adherent thin magnetic films on smooth nonmetallic substrates as well as on ceramics, plastic, glass and other dielectric materials.

Another object of the invention is the economical production of electroless nickel-iron film on glass, ceramic or plastic rods or sheets for use as bistable elements in computer memory or logic devices. It was found that by use of the disclosed processes, magnetic elements were created which had several desirable magnetic characteristics of good squareness ratio and coercive force making them easier and faster to switch from one stable state to the other and thus requiring cheaper driving elements as well as being cheaper to manufacture per se.

Another object of the invention is the production of an improved electroless metallic anisotropic and/or activated, catalytic and chelating foundation, providing a foundation for additional metallic deposits by any additional effective deposition method. In the case of addition of magnetic deposits it was found that the undercoating contributed to the production of an economical form of magnetic memory element having a high ratio of remanence to saturation induction (excellent rectangular hysteresis characteristics), a low coercive force, a low switching constant, high value of resistivity, fast response time, and no disturbed sensitivity.

Another object of the invention is the provision of a chemical coating process for deposition of a series of iron alloy materials wherein the proportion of iron in the composition may be controlled because at least one of a plurality of chemical baths is coated with a layer of silicone oil or another oxidation preventing barrier.

The present method of creating magnetic storage elements electrolessly does away with many of the troubles heretofore associated with the vacuum deposition and electroplating methods of depositing magnetic materials on substrates. These other methods are expensive and difficult to perform, difficult to maintain uniform film thickness throughout, and limited in production batches by the size of available vacuum chambers and electroplating holders. Here by simple and inexpensive chemical deposition processes, one or more magnetic material coatings may be added by dipping into large containers with large numbers of parts treated all at the same time.

A further object of the invention is to provide a method of creating a magnetic storage element in the form of a flat or toroidal thin film, which method comprises the steps of depositing one or more layers of nickel-iron alloys from baths containing hypophosphite by chemical means onto a substrate. The ratio of nickel to iron in the created film is proportioned to be close to 4 to 1, preferably 79 to 21, with iron preferably higher in the undercoat and nickel present to a greater degree in the outer coat, and the presence of phosphorous minimized to less than 1%.

Although herein the emphasis is on magnetic material under and outer coatings for use as magnetic memory elements, it is to be understood that other uses are contemplated. Since the undercoating is of good adherence to glass, ceramic and plastic substrates, it is useful in a preliminary way for deposits and coatings in general. The outer coating is in itself of such good magnetic qualities that it may be put upon active metallic surfaces in general and not only on the undercoating of the particular example set forth herein.

The present application deals mainly with means for forming undercoatings, i.e., ferromagnetic coatings directly on nonmetallic materials, but it also discloses secondary layers and chemical compositions and methods for depositing secondary films or overcoatings over such undercoating or preliminary layers. The claims for the means for providing secondary coatings wherein magnetic films are deposited on metal or underlying metal films are set forth in my copending application Serial No. 162,894, filed on December 28, 1961.

Claims for composite coatings are set forth herein.

The foregoing and other objects, features and advantages of the invention will be apparent from the following more particular description of the preferred embodiments of the invention, as illustrated in the accompanying drawings.

Figures 6, 7, 8:
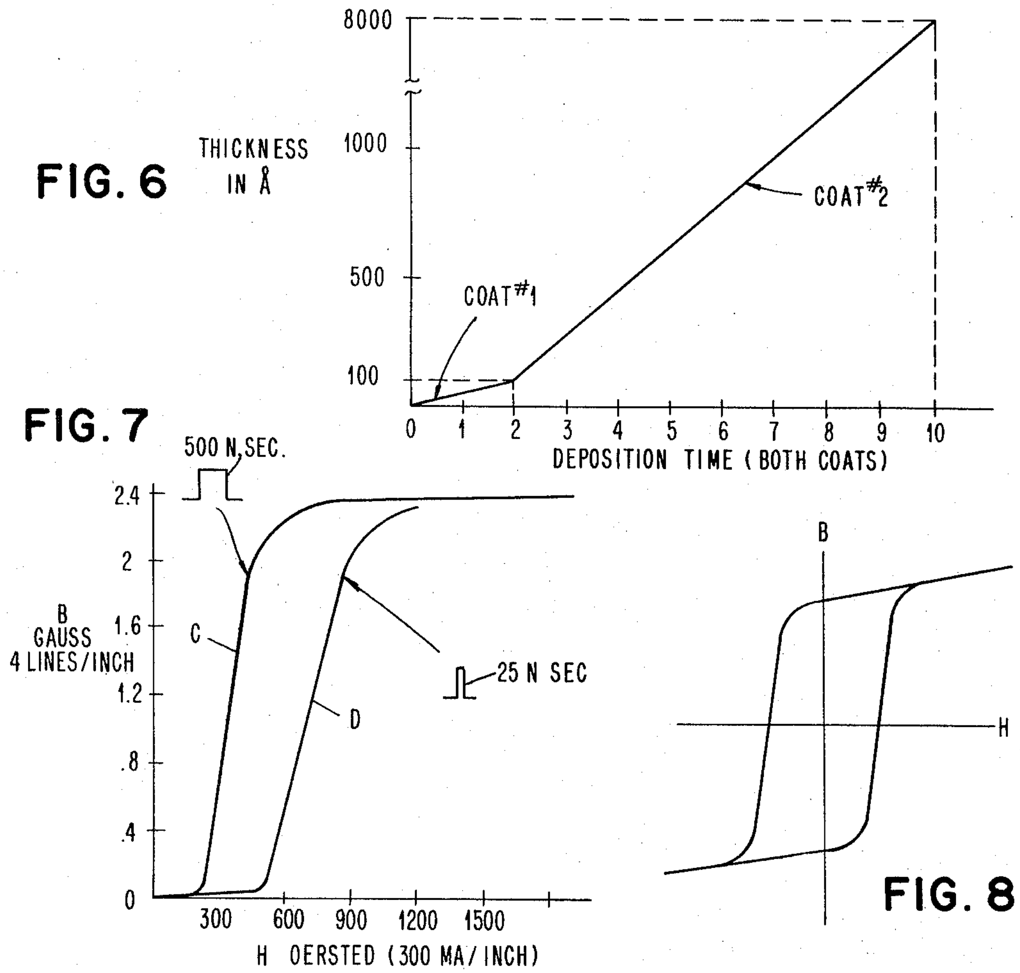
FIG. 6 is a chart showing how deposition thickness varies with deposition time with respect to the two different ferromagnetic films, one superimposed upon the other.

FIG. 7 is a chart showing S curves depicting the magnetic characteristics, with the coercive force projected to depict corresponding induced magnetic flux. The two curves are representative of magnetic conditions created by impulses of different duration. The one being a comparatively long impulse of 500 nsecs. and the other produced by spike pulse of 25 nsecs.

FIG. 8 shows a rectangular hysteresis curve generated by magnetic switching of a magnetic storage element made by the chemical deposition methods set forth herein; said element then being operated in the easy anisotropic direction.

Since the advent of use of magnetic elements for storage and memory purposes, there have been proposed many materials and processes involving sintered compositions, and electroplated or evaporated films. The present instance is a departure therefrom in the use of electroless chemical deposition processes for coating memory elements with magetic materials. Although in a general way ferrus hypophosphite chemical coating baths are not new, the particular formulations disclosed here yield new qualities of fine adherence on smooth substrates, low content of nonmetallics of the deposited film, film rich in magnetic constituents of nickel and iron, and excellent magnetic characteristics.

Heretofore, conventional eletcroless metal films should have been classified as metal-phosphide films with a range of phosphorous content up to 20%. Now the films disclosed here contain less than 1% phosphorous (often less than 0.25%) which is comparable to the range of so called "impurities" found in nickel-iron films plated by the expensive processes of electrodeposition or vacuum deposition. These new metal rich qualities aid for adherence of the 80/20 NiFe type film, its rapid deposition and its good magnetic qualities. There is disclosed here a method of creating a magnetic storage device in a flat or toroidal thin film, which method comprises the step of depositing one or more layers of nickel-iron alloys containing phosphorous by chemical means onto a substrate, the ratio of nickel to iron in the created film proportioned to be close to or at 80/20, with iron preferably higher in the undercoat and nickel higher in the outer coat, with the presence of phosphorous minimized to less than 1% phosphorous. Overall film thickness may range from 6000 to 8000 A. with the undercoat sometimes as thick as 1000 A., but one good proportion is a 100 A. undercoat covered with a 7000 A. outer layer which is achieved by a 2 minute dip into the first solution for the undercoat followed by an 8 minute dip into the second solution for the outer coat. Although the plastic or ceramic substrate surface is isotropic, the layers of the film are made anisotropic because the coats are laid in the presence of a magnetic field induced for example by a current carrying wire threaded through the center of a glass cylinder receiving the electroless films. The earth's field may be taken into consideration by arranging the wire and cylinder lengthwise east to west. As an optional arrangement, permanent magnets may be used to create the magnetic fields with the absence of extra heating effects. Separate storage units may be made by masking the substrate during deposition, or an entire sheet, cylinder or other shape may be coated and then cut into smaller sections.

Figures 1, 2:
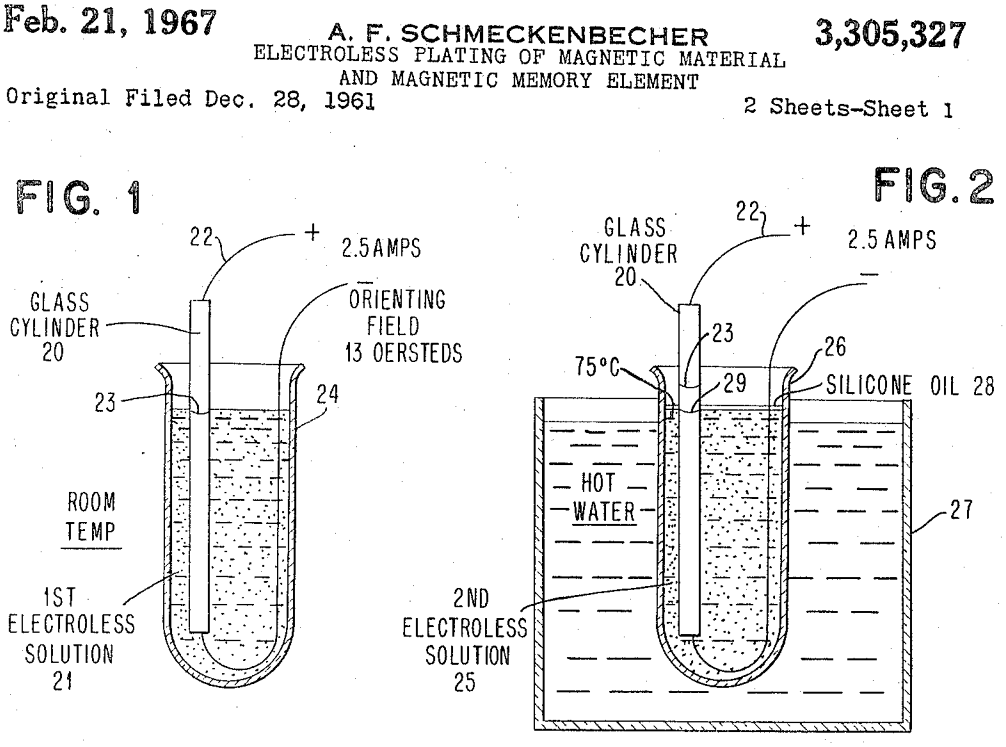
FIG. 1 is an elevation view showing the apparatus for depositing a preliminary film or a complete anisotropic ferromagnetic coating.
FIG. 2 is an elevation view showing the apparatus for depositing a secondary film or coating.

Turning now to the drawings, it may be explained that FIG. 1 shows a single glass cylinder 20 which is dipped into a first chemical bath 21 at room temperature for a period of two minutes during which time an orienting field is established by electrical current in the wire 22. Thus a preliminary film or undercoating 23 is deposited on the surface of the cylinder 20.

After the cylinder 20 is taken out of the first solution 21, it is allowed to dry and then is dipped into a second solution 25 shown in FIG. 2. In FIG. 2 the flask 26 is suspended in hot water held in a separate container 27 which is maintained at such a temperature so that the solution 25 is maintained at about 75° C. After cylinder 20 is plunged into the solution 25, the solution is immediately coated with the layer of silicone oil 28 which is added to prevent oxidation of the constituents of the solution and mainly to prevent the Fe ions from changing from $Fe^{++}$ to $Fe^{+++}$. During this same second coating operation which is to last about 8 minutes, the wire 22 carries a current of about 2.5 A. to create a field of about 13 oersteds to orient the deposit as it is formed around the cylinder. The second coating 29 thus formed is deposited directly on the preliminary magnetic coating and although the undercoating is only about 100 A., the second coating is quite a bit thicker to the point of about 8000 A.

Figure 3:
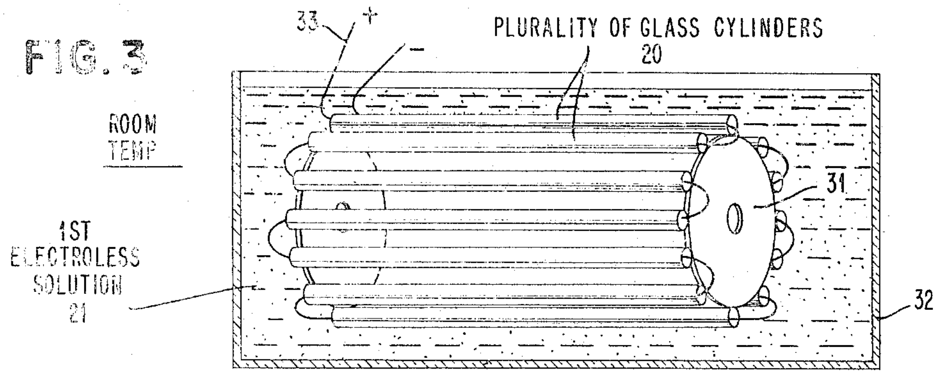
FIG. 3 is an elevation view showing in schematic fashion one way in which a plurality of substrates such as glass cylinders may be coated with the preliminary film similar to the one deposited in FIG. 1.
Figure 4:
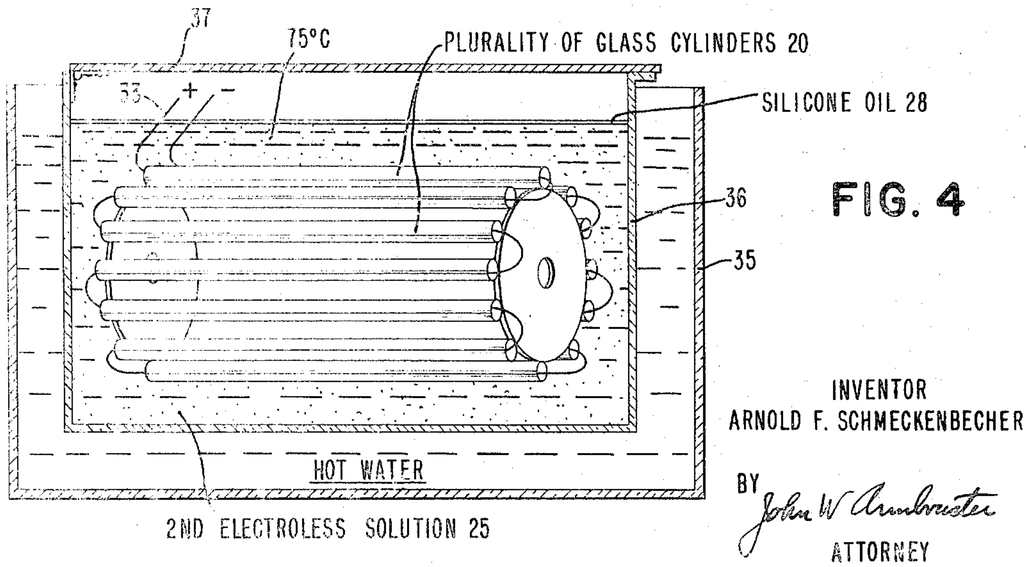
FIG. 4 is an elevation view showing the apparatus by which a plurality of cylinders may receive a secondary coating in a fashion somewhat similar to that set forth with respect to a single cylinder in FIG. 2.

FIGS. 3 and 4 are quite a bit similar to the apparatus of FIGS. 1 and 2 respectively, the only difference being that arrangements are made for coating a plurality of cylinders 20 at the same time. In FIG. 3 the series of elongated glass cylinders 20 are shown mounted on two end pieces 31 in a circular array with space between the cylinders allowing free deposition action to take place. The first solution 21 is held in a container 32 and the entire array of cylinders 20 is submerged in the solution. This is also maintained at room temperature and a continuous wire 33 is employed to carry current through all the cylinders so that an orienting magnetic field is created around the surface of all cylinders to control the anisotropic character of the deposited undercoating.

After the required time of submersion, for example, 2 minutes, the assembly of cylinders is removed and allowed to dry before the submersion in the second solution 25 shown in the apparatus of FIG. 4. There it is seen that an enlarged holder 35 contains hot water which maintains the second solution at about 75° C. Mounted inside container 35 is a secondary container 36 with walls which extend above the water level mark of container 35 and formed with a hinged lid 37 which may be raised to allow insertion of the array of cylinders 20 and also the addition of a layer 28 of silicone oil to limit or eliminate oxidation. In this secondary coating operation, the orienting field is again created through wire 33 and the deposition process is allowed to continue for about 8 minutes.

Before explaining how the coatings are varied as to nickel iron content and thickness as shown in the charts, it is believed best to set forth first the actual constituents of the two solutions or baths and the various examples of such methods of application which have been found very effective.

It has been found that uniform well adhering nickel-iron films may be deposited on nonmetallic surfaces, such as glass, plastics, etc., at temperatures from 0° C. to 99° C., preferably at room temperature, by inducing controlled decomposition of the plating solution and interrupting the plating after a desired thickness of the metal film has been deposited. The films adhere particularly well to the glass, if they contain a comparatively high percentage of iron.

The plating solution 21, FIG. 1, contains several components: a nickel salt (.5 g. Ni/liter or more), a ferrous salt (.5 g. Fe/liter or more), hypophosphite ions and a sequestering agent, dissolved in water. In addition, however, a small amount of ions of palladium is added to the acid plating solution at room temperature. The hypophosphite ions reduce the noble metal ions to the metal without setting free hydrogen. The metal is distributed as small particles of colloidal dimensions in the solution. The solution is now made alkaline by adding ammonia, triethanolamine or the like, and the smooth surface to be plated is immediately brought into contact with the solution.

If the surface to be plated is glass, such as cylinder 20, FIG. 1, the adhesion of the film 23 is improved if the glass has been soaked with sodium hydroxide solution or another strong alkaline solution for 30 minutes or more, or with diluted hydrogen fluoride or ammonium fluoride solution before plating.

It is not necessary to activate the surface to be plated by rinsing with stannous chloride and subsequently with palladium chloride before plating.

After immersion of the glass cylinder 20 and within a few minutes, hydrogen gas is set free and a clear uniform well adhering nickel-iron film 23 is deposited on all exposed surfaces.

For the 1st electroless solution 21 to form a preliminary coating 23:

*Example 1*

| | G. |
|---|---|
| Sodium hypophosphite | .5 |
| Sodium potassium tartrate | 1.5 |
| Ferrous ammonium sulfate | 1.0 |
| Nickelous sulfate | .7 |

were dissolved in 20 ml. water.

A few drops of diluted sulfuric acid were to bring the pH value of the solution to about 4.0.

.5 ml. of a 0.1% solution of palladium chloride in water containing 0.1% conc. hydrochloric acid, was added.

After 1 minute, 3.5 ml. of 29% ammonium hydroxide were added to bring the pH value of the solution to 9.2.

10 ml. of the solution were filled into a test tube 24 into which a glass surface is brought after being previously treated with 10 n NaOH for 30 minutes at room temperature, separated and the glass thoroughly rinsed with distilled water.

After 30 minutes the glass is taken out of bath 21, rinsed with water, then with acetone and dried.

The metal film 23 formed on the glass was clear, continuous and adhered well. It was about 1000 A. thick, contained 70% Ni, 30% Fe, was ferromagnetic and had a coercive force of about 10 oersteds.

As a 2nd example of the 1st electroless solution used to form a preliminary coating 23 the following formulation and process may be noted:

*Example 2*

| | G. |
|---|---|
| Sodium hypophosphite | .5 |
| Sodium potassium tartrate | 1.5 |
| Nickelous chloride | .2 |
| Ferrous chloride | 1.5 |

were dissolved in 20 ml. water.

A few drops of hydrochloric acid were added to bring the pH value of the solution to about 4.0.

.5 ml. of a 0.1% solution of palladium chloride in water containing 0.1% hydrochloric acid was added.

After about 1 minute, 3.5 ml. of 29% ammonium hydroxide were added to bring the pH value of the solution to about 9.2.

10 ml. of the solution were filled into test tube 24 and a glass surface 20 presented thereto, said glass surface 20 being previously treated with a 1% solution of ammonium fluoride in water and left standing at room temperature for 30 minutes, then separated and the glass 20 thoroughly rinsed with distilled water.

After 10 minutes of plating the glass surface 20, the glass was separated and rinsed with water. A metal or metal alloy film may be deposited on this coat. It may consist of nickel, a nickel-iron alloy, a nickel-cobalt alloy, nickel-iron-molybdenum alloy and others. It may be deposited by chemical reduction, electrolytically or by other methods. An example follows, showing the deposition of a nickel-iron alloy film by chemical reduction (electroless). A second 10 ml. of a 2nd electroless plating bath 25 was filled into the second test tube 26.

This second bath was used to deposit an overcoating 29 upon the undercoating 23 produced by Example 2 bath 21.

As an example, the 2nd plating solution contained:

| | | |
|---|---|---|
| Sodium hypophosphite | g. | .5 |
| Sodium potassium tartrate | g. | 1.5 |
| Nickelous chloride | g. | 1.0 |
| Ferrous chloride | g. | .5 |
| 29% ammonium hydroxide | ml. | 7 |

in 20 ml. water.

The plating solution was heated at 75° C. by placing test tube 26 in a tank 27 containing hot water which is maintained hot enough to insure a constant 75° C. of the solution 25.

After 10 minutes, a nickel-iron film 29 of an average thickness of about 15,000 A. had been plated on top of the iron rich nickel-iron underlayer 23.

The film 29 adhered firmly to the underlayer 23, which in turn adhered to the glass 20. The combined coating was ferro-magnetic and had a coercive force of about 4 oersteds.

While these electroless plating operations are taking place as described in the foregoing and shown in FIGS. 1 and 2, the wire 22 remains threaded through cylinder 20 and a current of about 2.5 amperes is impressed therein to create an orienting field of about 13 oersteds at the surface of cylinder 20 for creating circumferential anisotropic deposits of the magnetic material. The loose end of wire 22 is held removed as far as possible from the surface coating 23 to avoid disturbing the regular orientation thereof.

In a copending application, Serial No. 99,739, filed on March 31, 1961, now Patent No. 3,183,567, it is shown that separate small thin film magnetic elements may be made from larger objects such as glass cylinders which are coated in bulk. The process disclosed and claimed there relates to the technique of embedding a bundle of coated glass cylinders in a reversible cement while they are sliced or cut into toroids suitable for magnetic memory array elements.

Before explaining in greater detail the process and electroless bath formulation for the second coat 29 already noted in a general way, it may be pointed out that a process is disclosed to electrolessly plate nickel-iron films of unusual magnetic properties on metal surfaces, preferably on very thin nickel-iron films previously plated on nonmetallic surfaces by the method described with respect to preliminary coat 23 hereinbefore. The nickel-iron films 23 and 29 have a high ratio of saturation induction to remanence (squareness ratio), a low coercive force, low switching constant and other properties desirable for applications in computer memories and logic element circuits. These films contain 75–81% nickel, less than 1% phosphorous and the balance in iron.

A detailed account of bath 25 for the second coat 29 is as follows:

The film 29 is prepared by bringing the surface 20 to be plated at 75°–90° C. for 3–30 minutes in contact with a solution which contains 20 grams/liter to 50 g./l. preferably 30 g./l. of $NiCl_2.6H_2O$ or of another $Ni^{++}$-salt, and an amount of an $Fe^{++}$-salt, preferably $FeCl_2.4H_2O$, which corresponds to a ratio of $Ni^{++}$ to $Fe^{++}$ of 1.48 to 1.53, preferably 1.50, 50 grams/liter to 150 g./l. of sodium potassium tartrate, 10 g./l. to 50 g./l. preferably 25 g./l. of sodium hypophosphite or a corresponding amount of another metal hypophosphite or by hypophosphoric acid, and ammonia to bring the pH to 8–12, preferably 11.

Another résumé and detailed description of the method of applying magnetic coatings is as follows:

A piece of glass tubing 20, FIG. 1, of 0.03" O.D. and about 4" length is kept in a solution of 4 g. of sodium hydroxide in 10 ml. of water, for about 30 minutes after which it is taken out and rinsed with water. A length of #28 copper wire 22 is passed through the tube and connected to a D.C. power supply, 2.5 amps are passed through the wire during plating.

5 grams of soduim hypophosphite, 15 grams of Rochelle salt, and 1 gram of nickelous chloride are dissolved in 200 ml. of water. 10 ml. of this solution is filled into a small beaker. 1 ml. of a solution containing 0.2 g. of ferrous chloride per milliliter is added. Then 0.5 ml. of a 0.1% solution of palladium chloride is added. After 30 seconds 3 ml. of 28% ammonium hydroxide solution is added. The mixture 21 is transferred to a small test tube 24. The glass tube 20 to be plated is dipped into the mixture and left in it for 2 minutes at room temperature. Then the tube 20 is taken out and rinsed with water.

In preparation for the second bath, FIG. 2, 5 grams of sodium hypophosphite, 15 grams of Rochelle salt and 6 grams of nickelous chloride are dissolved in 200 ml. of water. 10 ml. of this solution is filled into a small beaker. 1.95 ml. of a solution containing 0.05 g. of ferrous chloride per liter is added. 3 ml. of 28% ammonium hydroxide solution is added. The mixture 25, FIG. 2, is transferred into a small test tube 26. The test tube is put into a water bath kept at 75° C. After about half a minute, the glass tube 20 to be plated is dipped into the plating mixture. A few drops of silicone oil 28 are added to the mixture to protect the plating solution from the atmosphere. The tube to be plated is left in for 8 minutes, then taken out, rinsed with water, then with acetone, dried and coated with a lacquer for protection (for instance, by dipping into acrylic lacquer solution "Krylon").

Figure 5:
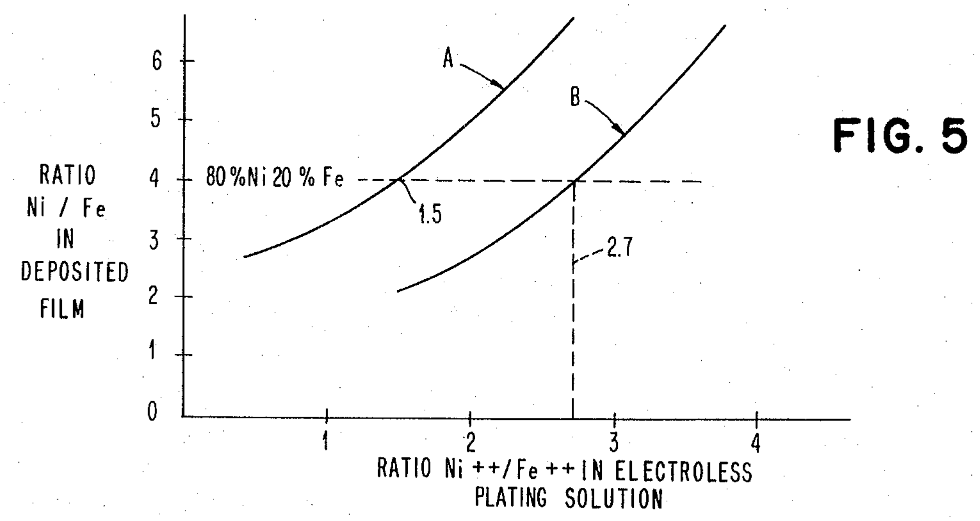
FIG. 5 is a chart showing the proportions of nickel/iron in thin film as deposited electrolessly by various proportions of $Ni^{++}/Fe^{++}$ in solution. The one curve represents proportions when the solution is exposed to air and the other curve represents proportions when the solution is covered to prevent oxidation.

The graph FIG. 5 shows that the composition of the plated films depends on the composition of the plating bath. (No silicone oil used in these last mentioned procedures.) Thickness of films is controlled by the plating time, FIG. 6, temperature and composition of the plating bath.

The films plated by the described method are about 8000 A., thick, contain about 80% nickel, 20% iron and 0.5–0.25% phosphorous.

The process requires no cobalt, it is rapid, requires no heavy metal substrate and is lower in the ratios of iron and phosphorous than heretofore thought possible.

In FIG. 2 it is shown that a layer of silicone oil 28 is present on top of the second electroless solution or bath 25. This silicone layer is added directly after the cylinder 20 is placed into the bath to start deposition of the second coat. The purpose of the silicone layer is to prevent changes in the iron ions $Fe^{++}$. It is found that the electroless platings are more reproducible if air is excluded from the plating solution during plating. So the plating solution is covered with a second liquid phase of lighter specific weight than the plating solution, such as silicone oil 28. It is believed that in contact with hair, a part of the $Fe^{++}$ is oxidized to $Fe^{+++}$, and consequently a higher concentration of $Fe^{++}$ is needed in the plating solution. The ratio of $Ni^{++}/Fe^{++}$ needed to plate 80% nickel, 20% iron films under exclusion of air is 2.68 to 2.73, preferably 2.70. The chart, FIG. 5, shows the proportions of nickel/iron in a thin film as deposited electrolessly by various proportions of $Ni^{++}/Fe^{++}$ in solution. The curve A relates to a solution exposed to air, and the curve B relates to a covered solution. It is noted that in order to attain the 80/20 nickel iron film ratio, a smaller part of iron is required in the silicone covered solution, i.e., ratio 2.7 instead of ratio 1.5 of ions in the solution.

FIG. 6 shows in chart form how the thickness of a composite coating of two layers is attained with respect to time of deposition. It is evident that the particular depositions referred to are those whereby two minutes are used for the first coat and eight minutes for the outer coating.

FIG. 7 shows S curves of magnetic characteristics of the deposited films and vertical receptiveness or inductance of lines of flux in gauss as compared with horizontal coercivity or field strength applied in oersteds. The film tested was the two minute plus eight composite film of FIG. 6. S curve C relates to a magnetic state imposed by a relatively long pulse of 500 n sec. with a low coercive force produced by 300–600 ma./inch, and a rise time of about 5 n sec. S curve D relates to magnetic switching imposed by a short pulse of 25 n sec. with a coercive force produced by 600–1200 ma./inch. and a rise time also about 5 n sec.

FIG. 8 shows hysteresis loop characteristics of composite films coated by the procedures explained relative to the other views and FIGS. 6 and 7. It is evident that the loop has a good squareness ratio and a low coercive force which bears out the findings of fast switching speeds exhibited also in FIG. 7.

Although magnetic characteristics of thin films are a desirable attribute as stressed hereinbefore, the additional factor of adherence to high temperature substrates is also of separate value for the basic formation of electrodes and conductors for printed circuits and components in general. Therefore it is contemplated that the films noted, singly or jointly, are to be considered as applied to components in general and printed circuits with or without such components, as well as to magnetic elements for use per se.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method for electrolessly plating on a substrate a magnetic thin film having bistable characteristics and having adaptation as computer memory and logic element, said method comprising immersing said substrate in a solution consisting essentially of the following:

| | | |
|---|---|---|
| $H_2PO_2^-$ | g./l. | From about 11 to 13 |
| $C_4H_4O_6^{--}$ | g./l. | From about 27 to 33 |
| $Fe^{++}$ | g./l. | From about 6 to 39 |
| $Ni^{++}$ | g./l. | From about 0.8 to 7 |
| $Pd^{++}$ | mg./l. | From about 12 to 21 |

where said solution is formed by first dissolving the water soluble salts of the following ions in water: $H_2PO_2^-$; $C_4H_4O_6^{--}$; $Ni^{++}$; and $Fe^{++}$; thereafter bringing the pH of the aqueous solution of $H_2PO_2^-$; $C_4H_4O_6^{--}$; $Ni^{++}$; and $Fe^{++}$ to a value of about 4 by adding thereto sulfuric acid; thereafter adding to said aqueous solution at the pH of about 4 a solution of about 12 to 21 milligrams of $Pd^{++}$ in water; and, after about 1 minute, adding sufficient $NH_4OH$ to bring the pH of the result reaction product to a value of about 9.

2. A method for electrolessly plating on a substrate a magnetic thin film having bistable characteristics and having adaptation as computer memory and logic element, said method comprising immersing said substrate for about 2 minutes in a solution consisting essentially of the following:

| | | |
|---|---|---|
| $H_2PO_2^-$ | g./l. | From about 11 to 13 |
| $C_4H_4O_6^{--}$ | g./l. | From about 27 to 33 |
| $Fe^{++}$ | g./l. | From about 6 to 39 |
| $Ni^{++}$ | g./l. | From about 0.8 to 7 |
| $Pd^{++}$ | mg./l. | From about 12 to 21 |

where said solution is formed by first dissolving the water soluble salts of the following ions in water: $H_2PO_2^-$; $C_4H_4O_6^{--}$; $Ni^{++}$; and $Fe^{++}$; thereafter bringing the pH of the aqueous solution of $H_2PO_2^-$; $C_4H_4O_6^{--}$; $Ni^{++}$; and $Fe^{++}$ to a value of about 4 by adding thereto sulfuric acid; thereafter adding to said aqueous solution at the pH of about 4 a solution of about 12 to 21 milligrams of $Pd^{++}$ in water; and, after about 1 minute adding sufficient $NH_4OH$ to bring the pH of the result reaction product to a value of about 9; thereafter immersing said coated substrate for about 8 minutes in a second reaction mixture where said second reaction mixture consists essentially of the following:

| | G./l. |
|---|---|
| $H_2PO_2^-$ | 11 to 16 |
| $C_4H_4O_6^{--}$ | 25 to 30 |
| $Ni^{++}$ | 5 to 13 |
| $Fe^{++}$ | 2 to 8 |

with a ratio of $Ni^{++}/Fe^{++}$ of 1 to 3; and sufficient $NH_4OH$ to maintain the pH of said second reaction mixture at a pH of about 11.

3. A bistable magnetic film having the low phosphorous content of from .25% to 1% made in accordance with the method of claim 2.

4. A method for depositing a magnetic thin film having bistable magnetic characteristics and having adaptation as a computer memory in logic elements comprising the steps of:

providing a clean substrate surface;

immersing said cleaned substrate surface for several minutes in an electroless plating solution consisting essentially of;

about 25 grams per liter of sodium hypophosphite,
about 75 grams per liter of Rochelle salt,
a range of 5 to 10 grams per liter of nickelous chloride,
a range of 75 to 200 grams per liter of ferrous chloride,
sufficient hydrochloric acid to bring the nickel, ferrous, hypophosphite and tartrate ions to a pH of about 4,
about .05 liter of a 1% solution of palladium chloride in hydrochloric acid,
thereafter after about 1 minute adding sufficient alkalizer to raise the pH of the entire solution to at least 9,
maintaining the solution at room temperature, and subjecting said substrate surface to an orienting magnetic field.

5. The method of claim 4 plus additional steps to add an overcoating film on the underlying film on said substrate surface comprising the steps of:

immersing said substrate surface coated with the first film in an electroless plating bath consisting essentially of about 25 grams per liter of sodium hypophosphite,
about 50 grams per liter of sodium potassium tartrate,
about 30 grams per liter of $NiCl_2 \cdot 6H_2O$,
sufficient amount of $FeCl_24H_2O$ to create a ratio of $Ni^{++}$ to $Fe^{++}$ of 2.7,
sufficient ammonia to raise the pH of the bath to about 11, subjecting the immersed substrate surface to an orienting magnetic field, coating said bath with a thin coat of oil, and maintaining said bath at a temperature between 75° to 99° C. with said substrate in said bath for several minutes to form a magnetic thin film having bistable characteristics, a square hysteresis loop and a coercivity between 1 to 4 oersteds.

6. The method of producing metal magnetic cores having rectangular magnetic hysteresis loops which comprises the steps of:

cleaning a glass cylinder, preparing an electroless nickel iron bath with iron predominating and with a ratio of iron to nickel ions up to 6, immersing said cylinder into said bath for about two minutes, removing said cylinder, preparing a second electroless nickel iron bath with nickel predominating and with a ratio of nickel to iron ions of up to about 3, and immersing said cylinder into said bath for about eight minutes.

7. A magnetic memory element comprising a cylindrical substrate whereon a plurality of superimposed adherent magnetic nickel iron films form a metal core capable of assuming a plurality of stable remanence conditions, and wherein an undercoating film is up to 1,000 A. in thickness and consisting essentially of a ratio of nickel to iron of about 70/30 and the presence of less than 1% phosphorous, and an outer film is of about 7,000 A. thickness and consisting essentially of a ratio of nickel to iron of about 79/21 and the presence of less than 1% phosphorous.

References Cited by the Examiner

UNITED STATES PATENTS

| | | | |
|---|---|---|---|
| 2,430,581 | 11/1947 | Pessel | 117—227 |
| 2,532,283 | 12/1950 | Brenner et al. | 117—50 |
| 2,643,130 | 6/1953 | Kornei | 117—71 |
| 2,691,072 | 10/1954 | Mathes | 179—100.2 |
| 2,827,399 | 3/1958 | Eisenberg | 117—130 |
| 2,900,282 | 7/1959 | Rubens | 117—227 |
| 3,098,803 | 6/1960 | Godycki et al. | 117—71 |
| 2,976,174 | 3/1961 | Howard | 117—93.2 |
| 3,065,105 | 11/1962 | Pohm | 117—93.2 |
| 3,116,159 | 12/1963 | Fisher et al. | 117—47 X |
| 3,123,484 | 3/1964 | Pokras et al. | 106—1 |
| 3,138,479 | 6/1964 | Foley | 117—47 |
| 3,140,188 | 7/1964 | Ziringiebl et al. | 117—160 |
| 3,171,754 | 3/1965 | Smaller | 117—71 |
| 3,178,311 | 4/1965 | Cann | 117—160 |
| 3,183,492 | 5/1965 | Chow et al. | 117—71 X |
| 3,183,567 | 5/1965 | Riseman et al. | 340—174 X |
| 3,197,749 | 7/1965 | Clinehens et al. | 117—71 X |
| 3,221,312 | 11/1965 | MacLachlan | 340—174 |
| 3,228,012 | 1/1966 | Meier | 340—174 |

WILLIAM D. MARTIN, *Primary Examiner.*

H. E. COLE, W. D. HERRICK, *Assistant Examiners.*